J. W. DOUGAL.
AGRICULTURAL BOILER.

No. 177,226. Patented May 9, 1876.

Witnesses
John A Tauberschmidt
W. J. Baxter

Inventor
John W. Dougal
by his Attys.
Cox & Cox

UNITED STATES PATENT OFFICE.

JOHN W. DOUGAL, OF MANSFIELD, OHIO.

IMPROVEMENT IN AGRICULTURAL BOILERS.

Specification forming part of Letters Patent No. 177,226, dated May 9, 1876; application filed February 23, 1876.

*To all whom it may concern:*

Be it known that I, JOHN W. DOUGAL, of Mansfield, in the county of Richland and State of Ohio, have invented a new and useful Improvement in Steamers and Boilers, of which the following is a specification, reference being had to the accompanying drawings.

The invention relates to an improvement in steamers and boilers which are employed for steaming and cooking food for stock and other farm uses; and consists in the devices hereinafter specifically designated.

The object of the invention is to provide an efficient steamer and boiler for the use of agriculturists.

Figure 1:
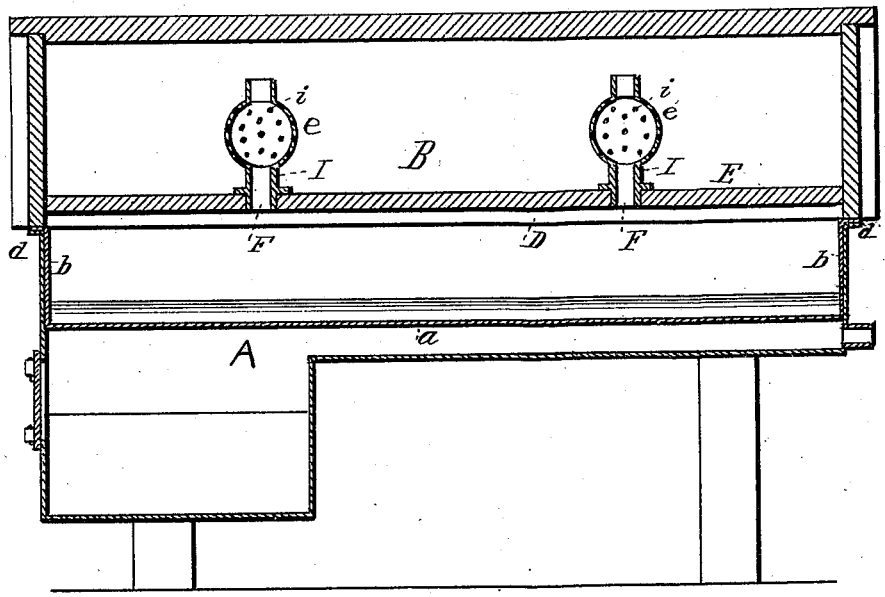
Figure 2:
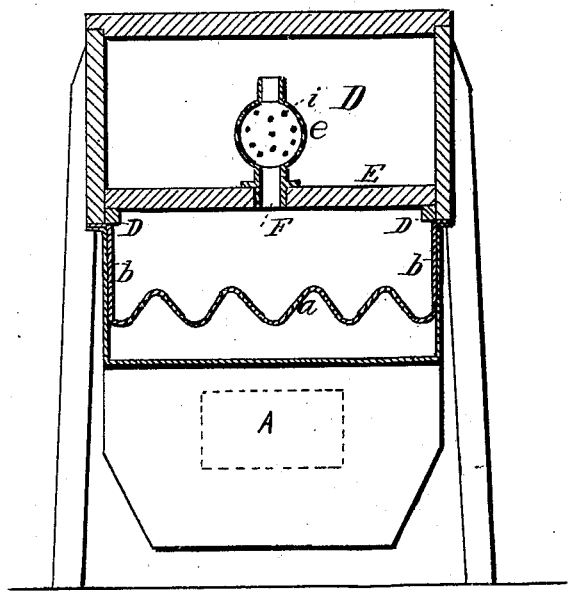

Figure 1 is a central longitudinal section of a device embodying the elements of the invention. Fig. 2 is a transverse section of same.

In the accompanying drawings, A represents a furnace provided at one end with a door, and a flue at the other, and suspended by any ordinary means from the plate $a$. This plate $a$ is corrugated and provided with the sides $b$, forming a water-chamber, having the flanges $d$ provided on its upper edge, to which flanges the tank B is secured by bolting or otherwise. Immediately above the flanges $a$, and within the tank B, is attached the interior cleats D, upon which rests the plate E, provided with apertures F, in which are placed the globes $e$, of suitable size, and provided with apertures $i$, any desirable number being employed, and also with the neck I, which is provided with male threads and secured within the aperture F thereby. Thus the plate E serves as a covering for the water-chamber and as a bottom for the tank B.

The device may be provided with any suitable covering and as many legs as desired.

The plate $a$, being corrugated horizontally, presents a much broader surface to the direct action of the heat than it would if non-corrugated. Thus the food is cooked more rapidly, effectively, and with a less amount of fuel than in those heretofore used.

It is obvious that any number of globes may be employed in the device, and that the tank B may be divided into compartments and different kinds of food steamed or cooked at the same time. It is also obvious that the perforated globe will distribute the steam equally through the food surrounding it, thus cooking the food on all sides, and obviating, in a great measure, the old necessity of stirring the food.

Operation: To use the device as a steamer, it is only necessary to fill the water-chamber with water, adjust the plate E in position, place the material to be steamed in the tank, and kindle the fire, when steam will be generated and ascend up through the apertures F into the globes $e$, and thence out in the tank B, thereby effectually steaming the food. To use this device as a boiler, remove the plate F, properly fill the water-chamber, and kindle the fire in the furnace.

It is obvious that the device may be used both as a steamer and boiler by putting the food to be boiled in the water-chamber, and that to be steamed in the tank over the plate E.

I do not claim, broadly, the preparation of food by means of steam injected through a vertical tube, as that is a well-known device; but What I do claim, and desire to secure by Letters Patent, is—

In an agricultural steamer, the combination of the perforated globe $e$ with a boiler having a corrugated bottom, substantially as shown and described.

In testimony that I claim the foregoing improvement in steamers and boilers, as above described, I have hereunto set my hand this 17th day of February, 1876.

JOHN W. DOUGAL.

Witnesses:
H. D. B. WILLIAMS,
T. E. BARROW.